United States Patent Office 3,766,149
Patented Oct. 16, 1973

3,766,149
DIALLYL PHTHALATE-ETHYLENE PRECOPOLYMER AND PROCESS FOR PREPARATION THEREOF
Masayoshi Oiwa, Osaka, Akira Matsumoto, Suita, Kenji Yokoyama, Hata-machi, Hiromi Sasaki and Masao Tojima, Amagasaki, and Kazuya Matsumoto, Kobe, Japan, assignors to Osaka Soda Co., Ltd., Osaka, Japan
No Drawing. Filed Mar. 10, 1972, Ser. No. 233,745
Claims priority, application Japan, Mar. 15, 1971, 46/14,605
Int. Cl. C08f 15/02
U.S. Cl. 260—78.5 HC                  16 Claims

ABSTRACT OF THE DISCLOSURE

A diallyl phthalate-ethylene precopolymer comprising 20 to 95% by weight of a diallyl phthalate selected from the group consisting of diallyl ortho-phthalate, diallyl iso-phthalate, and diallyl terephthalate, and 80 to 5% by weight of ethylene, the amounts being based on the total weight of the monomers, and a process for the production thereof.

---

This invention relates to a diallyl phthalate-ethylene precopolymer capable of forming a cross-linked copolymer having desirable properties such as thermal stability, weatherability, resistance to cracks, resistance to water and chemicals, good dimensional stability, improved flexibility, improved drillability, good insulation resistance, and low dielectric constant, and to a process for producing such precopolymer. The precopolymer obtained has superior flow properties at the time of fabrication.

The precopolymer of this invention has pendant allyl unsaturated groups, and is fusible. It can be formed into various copolymers ranging from resins to elastomers which have desirable properties suitable for a variety of purposes, by an ordinary vulcanizing method.

Diallyl phthalate resins and polyethylene resins are of course known, and exhibit different physical properties in different end uses. With the expansion of an area in which these resins can find applications, many attempts have been made to provide various modified resins, for example, copolymerized resins, grafted resins, or blended compositions, which can find a wider range of applications. However, a copolymer of diallyl phthalate and ethylene has not heretofore been proposed at all for such uses.

British Pat. 584,324 gives a description about ethylene interpolymers, and in order to impart higher softening temperatures and tensile strength to ethylene polymers, provides modified ethylene interpolymers produced by subjecting ethylene together with a divinyl or diallyl ester of a saturated dicarboxylic acid, to an elevated temperature and pressure, preferably in the presence of oxygen or a per-compound as a catalyst. The British patent discloses the utilization of diallyl esters of saturated dicarboxylic acids, such as diallyl oxalate or diallyl sebacate, but is quite silent on the possibility of utilizing a diallyl ester of an aromatic dicarboxylic acid having an unsaturated double bond. As a matter of fact, the British patent discloses only diallyl oxalate and diallyl sebacate as the diallyl ester of a saturated dicarboxylic acid. The examples in this British patent show that an ethylene-rich copolymer containing a diallyl oxalate component in an amount of about 21% at most is produced using diallyl oxalate as the diallyl ester of a saturated dicarboxylic acid, and the resulting solid copolymer is insoluble in tetrahydronaphthalene at 190° C.

Research and development work on the polymerization and copolymerization of diallyl phthalate which is a diallyl ester of an aromatic dicarboxylic acid having an unsaturated double bond has led to the discovery that diallyl phthalate copolymerizes with ethylene to form a precopolymer which possesses the above-mentioned desirable properties and is cross-linkable. It has also been found that the resultant precopolymer is fusible and is well soluble in oganic solvents, and can be cross-linked in the presence of a cross-linking agent to produce products which find a wide range of applications; and that the copolymer of allyl phthalate and ethylene exhibits superiority in the above-mentioned properties compared with the copolymers of ethylene and diallyl esters of a saturated dicarboxylic acid, such as diallyl oxalate or diallyl sebacate.

Accordingly, an object of this invention is to provide a diallyl phthalate-ethylene precopolymer capable of forming a cross-linked copolymer having desirable properties such as thermal stability, weatherability, resistance to cracks, resistances to water and chemicals, good dimensional stability, improved flexibility, improved drillability, good insulation resistance, and low dielectric constant.

Another object of this invention is to provide a process for preparing such precopolymer.

Many other objects of this invention and its advantages will become more apparent from the following description.

The precopolymer of this invention comprises 20 to 95% by weight, preferably 40 to 95% by weight, more preferably above 50% by weight and up to 95% by weight, and especially 55 to 95% by weight, of diallyl phthalate selected from the group consisting of diallyl ortho-phthalate, diallyl iso-phthalate and diallyl terephthalate, and 80 to 5% by weight, preferably 60 to 5% by weight, more preferably less than 50% by weight and up to 5% by weight, and especially 45 to 5% by weight, of ethylene, such amounts being based on the total weight of the two monomers.

The precopolymer has a relatively good random copolymerizability. For example, in a precopolymer obtained by polymerizing the monomers in benzene as a solvent at 80° C. and 200 kg./cm.² gauge, the reactivity ratio between diallyl ortho-phthalate ($M_1$) and ethylene ($M_2$) is $\gamma_1 = 0.65 \times 2$ and $\gamma_2 = 0.59 \times \frac{1}{2}$, the reactivity ratio between diallyl terephthalate ($M'_1$) and ethylene ($M'_2$) is $\gamma'_1 = 0.90 \times 2$ and $\gamma'_2 = 0.50 \times \frac{1}{2}$, and the reactivity ratio between diallyl iso-phthalate ($M''_1$) and ethylene ($M''_2$) is $\gamma_1'' = 0.87 \times 2$ and $\gamma_2'' = 0.50 \times \frac{1}{2}$. In the present invention, the reactivity ratio of monomers is measured in accordance with the Fineman Ross method [M. Fineman and S. D. Ross: J. Polymer Sci., 5, 259 (1950)].

Preferred precopolymers in accordance with this invention are those having a number average molecular weight ($\overline{M}_n$) [measured in a benzene solution at 37° C. using Hewlett Packard 302 apparatus in accordance with the vapor pressure osmometer method] of 2,000 to 30,000, preferably 2,000 to 20,000, more preferably 2,000 to 15,000, and especially 2,000 to 10,000. The precopolymer has pendant allyl unsaturated groups, and the amount of the unsaturated group should preferably be such that the bromine value of the precopolymer [as measured by the Bromine-Bromate method: W. Simpson and T. Holt; J. Polymer Sci., 18, 335 (1955)] is in the range of 5 to 61.5, preferably 12 to 61.5, especially 16 to 61.5.

The precopolymer of this invention exhibits excellent solubility, and in a preferred embodiment, the precopolymer forms a true solution in benzene at 50° C. in a concentration of 30% by weight based on the weight of the benzene.

The cross-linkable diallyl phthalate-ethylene precopolymer of this invention can be obtained by copolymerizing diallyl phthalate selected from the group consisting of diallyl ortho-phthalate, diallyl iso-phthalate and diallyl tere-phthalate with ethylene at an elevated temperature and pressure, preferably at room temperature to 300° C. and 5 kg./cm.$^2$ to 3,000 kg./cm.$^2$, in the presence of a radical initiator.

The above diallyl phthalate isomers may be used singly or as an admixture of two or three. The properties of the resulting precopolymer and its cross-linked product can be changed as desired according to the type and amount of the isomers. It is preferred that 20 to 95% by weight of the diallyl phthalate should be copolymerized with 80 to 5% by weight of ethylene, the amounts being based on the total weight of the two monomers.

As previously stated, the reaction is preferably carried out at room temperature to 300° C. and 5 kg./cm.$^2$ to 3,000 kg./cm.$^2$. But most frequently, temperatures of 50 to 150° C. and pressures of 30 kg./cm.$^2$ to 1,000 kg./cm.$^2$ are employed.

The reaction is carried out in the presence of a radical initiator, the examples of which are molecular oxygen, molecular oxygen-containing gas such as air, $H_2O_2$, organic peroxides such as dibenzoyl peroxide, ditertiary-butyl peroxide, dicumyl peroxide, dilauroyl peroxide, diacetyl peroxide, diisopropyl peroxycarbonate, diethylhexyl peroxycarbonate, or tert.-butyl perbenzoate, inorganic persulfates such as ammonium persulfate or sodium persulfate, and organic diazo compounds such as azobisisobutyronitrile or 4,4'-azobis-4-cyanoic acid.

The amount of the radical initiator is varied according to the type of the initiator, the reaction temperature, the reaction pressure, the polymerization method, etc. For example, the most commonly used amount is about 0.0001 to 0.05 mole percent based on the total amount of diallyl phthalate and ethylene.

The polymerization may be carried out in a manner known per se, such as in solution, bulk, suspension or emulsion or by a combination of these methods. The type and amount of the initiator are optionally chosen according to the type of polymerization reaction. The solution or modified solution polymerization is one of the preferred types of polymerization reactions that can be applied in the present invention.

Specific examples of the solvent that can be used for solution polymerization include aromatic hydrocarbons such as benzene, toluene, or xylene, aliphatic or alicyclic hydrocarbons such as pentane, hexane, or cyclohexane, halogenated aliphatic hydrocarbons such as chloroform or dichloroethane, and ketones such as acetone or methyl ethyl ketone. These solvents may be used singly or in admixtures of two or more. The aromatic hydrocarbons are most preferred. The amount of the solvent can be chosen optionally according to the type of the solvent, the composition of the feed monomers, the reaction pressure, the reaction temperature, etc.

Suspending or dispersing agents can be used in the suspension polymerization, and if desired, the above-mentioned solvent can be conjointly used to perform modified suspension polymerization. Examples of the useful suspending or dispersing agents include polyvinyl alcohol, polyethylene glycol, or carboxymethyl cellulose. The amount of the suspending or dispersing agent is at most 1% by weight based on the reaction system.

When emulsion polymerization is utilized, known emulsifiers can be used. Examples of the preferred emulsifier are anionic surfactants and anionic-nonionic surfactants, for example, sodium laurylsulfate, sodium dodecyclbenzenesulfonate, and phosphoric acid esters of polyoxyethylene alkylphenyl ethers.

The polymerization operation for obtaining the pre-copolymer is not particularly restricted, and any known operations can be used in the above-mentioned various types of polymerization. For example, an autoclave is charged with predetermined amounts of diallyl phthalate, initiator, and benzene, and oxygen is substantially removed under reduced pressure. Into the resulting system, a predetermined amount of purified ethylene is introduced, and reacted with the diallylphthalate for a predetermined period of time. After extraction and drying, a copolymer of diallylphthalate and ethylene is obtained. The polymerization reaction is stopped at a time when the intended pre-copolymer is formed, especially before the product becomes a gel.

The time required until the product becomes a gel varies accordinng to the proportion of ethylene fed, the type of the initiator, its concentration, or the polymerization temperature and the type of polymerization, and can herefore be chosen according to these factors. The reaction is stopped at any desired time before substantial gel formation occurs when the number average molecular weight is not more than 30,000, preferably not more than 20,000, more preferably not more than 15,000, especially not more than 10,000. The stopping of the polymerization reaction is most effectively achieved by lowering the reaction temperature below the decomposition temperature of the initiator. Or it can be effected by adding a polymerization inhibitor such as hydroquinone or quinone.

The separation of the precopolymer from the reaction product can be performed by various means. If, for example, solution polymerization is employed, the pressure of the product system is reduced to atmospheric pressure after cooling, and the generated unreacted ethylene is recovered. To the residue a large excess of a non-solvent or poor solvent for the resulting polymer, such as alcohols is added to extract unreacted diallyl phthalate, initiator, etc. The precipitated precopolymer is separated and recovered, followed by drying. It is also possible to deactivate the initiator by adding the above-mentioned polymerization inhibitor before the extracting procedure, and subject the residue to extraction after evaporating off the solvent as much as possible. The same operation can be taken in the case of the bulk polymerization.

In the case of the emulsion polymerization and suspension polymerization, a flocculating agent such as NaCl or $CaCl_2$ is added as desired to the reaction product system to separate it into two layers, and the organic layer is recovered. This layer is treated in the same way as set forth above to recover the intended precopolymer.

It was confirmed by an infrared spectrogram, a nuclear magnetic resonance spectrogram, and by other chemical analyses that the resulting precopolymer is a precopolymer of diallyl phthalate and ethylene. In this precopolymer, the monomeric units are distributed at random in the polymer chain, and the precopolymer can be readily cross-linked by heating a small amount of a radical initiator which is the same as the organic peroxides or organodiazo compounds illustrated above, at a temperature of, for example, 50 to 200° C. Precopolymers with a high ethylene content become elastomers of good transparency, adhesiveness, thermal stability, and mechanical strength upon crosslinking. On the other hand, copolymers of a high diallyl phthalate content have better flexibility and flowability than the conventional dially phthalate resins. These copolymers can be used in various applications. For example, these copolymers exhibit improved properties over diallyl phthalate resins and polyethylene resins in the fields of film-forming materials for paints, adhesives, laminated resins, fabricated resins, and blends with various resin materials.

The invention will be further illustrated by the following examples and controls.

EXAMPLES 1 TO 9 AND CONTROL 1

A 100 ml. autoclave was charged with predetermined amounts of diallyl ortho-phthalate, 0.01 mol/liter of azobisisobutyronitrile, and 50 ml. of benzene. Then, using a Dry Ice-methanol bath, degassing was performed at reduced pressure. The autoclave was then purged with ethylene, and ethylene was introduced into it under pressure. The amount of ethylene fed was measured by weighing the autoclave before and after feeding ethylene. After reacting for a predetermined period of time at 80° C., the reaction mixture was poured into a large amount of cold methanol to precipitate the polymer which was formed. The polymer was washed repeatedly with methanol, and dried at reduced pressure until its weight became constant. The conversion was measured. The polymer was purified by recrystallization from a mixture of benzene and methanol. The composition of the polymer was determined from the saponification degree, and checked by the elemental analysis and the nuclear magnetic resonance spectrography. The degree of unsaturation of the precopolymer was computed from its bromine value. The measurement of the bromine value was done by quantitative analysis of allyl alcohol freed by the saponification of the precopolymer, in accordance with the Bromide-Bromate method. The molecular weight of the resulting precopolymer was measured by the vapor pressure osmometer (Hewlett Packard 302). The results are given in Table I.

each. A solvent (2 cc.) was added to each test tube, and the solubility of each precopolymer was examined. The solubility at 50° C. was examined in the case of some solvents. The melting point of each copolymer was measured by a micro melting point measuring apparatus. The results are given in Table II.

TABLE II

| | Melting point (° C.) | Solubility | | | | | | | |
|---|---|---|---|---|---|---|---|---|---|
| | | Acetone | | Benzene | | Chloroform | | Hexane | |
| | | Room temp. | 50° C. | Room temp. | 50° C. | Room temp. | 50° C. | Room temp. | 50° C. |
| Example 10: | | | | | | | | | |
| Precopolymer of Example 1 | 49–58 | X | X | ⊚ | ⊚ | ⊚ | ⊚ | △ | △ |
| Precopolymer of Example 2 | 46–49 | X | X | ⊚ | ⊚ | ⊚ | ⊚ | X | ○ |
| Precopolymer of Example 4 | 28–37 | X | △ | ⊚ | ⊚ | ⊚ | ⊚ | X | X |
| Precopolymer of Example 7 | 42–51 | ⊚ | △ | ⊚ | ⊚ | ⊚ | ⊚ | X | X |
| Precopolymer of Example 8 | 92–94 | ⊚ | ⊚ | ⊚ | ⊚ | ⊚ | ⊚ | X | X |
| Control 2: Commercially available lower molecular weight polyethylene | 106 | X | X | X | △ | △ | ⊚ | X | ⊚ |

NOTE.—⊚=Completely dissolved; ○=Slightly turbid; ⊛=Considerably turbid; △=Swelled; X=Insoluble.

EXAMPLES 11 TO 18

A 100 ml. autoclave was charge with a predetermined amount of diallyl isophthalate, 0.01 mol/liter of azobisisobutyronitrile, and 50 ml. of benzene. The subsequent procedure was the same as described in Examples 1 to 9 above to form precopolymers. The results are given in Table III.

TABLE III

| | DAIP $[M''_1]$ (ml.) | Ethylene $[M''_2]$ (g.) | $F=\frac{[M''_1]}{[M''_2]}$ | Polymerization time (min.) | Yield of polymer (percent) | Saponification degree | $f$ | Bromine value | Degree of residual unsaturation | Molecular weight (×10³) | Degree of polymerization | |
|---|---|---|---|---|---|---|---|---|---|---|---|---|
| | | | | | | | | | | | $m$ | $n$ |
| Example: | | | | | | | | | | | | |
| 11 | 1.6 | 25.1 | 0.00816 | 100 | 3.3 | 97.2 | 0.0309 | 13.8 | 0.415 | | | |
| 12 | 3.0 | 23.2 | 0.0165 | 130 | 3.6 | 164.0 | 0.0637 | 23.3 | 0.419 | | | |
| 13 | 5.0 | 22.9 | 0.0280 | 140 | 2.8 | 219.0 | 0.105 | 31.2 | 0.418 | 3.52 | 6.9 | 65.2 |
| 14 | 7.5 | 22.4 | 0.0429 | 150 | 2.6 | 269.0 | 0.164 | 38.3 | 0.413 | | | |
| 15 | 10.0 | 21.6 | 0.0593 | 160 | 2.9 | 293.0 | 0.206 | 41.8 | 0.404 | 3.68 | 9.6 | 46.8 |
| 16 | 15.0 | 19.5 | 0.0985 | 170 | 1.1 | 342.0 | 0.344 | 48.7 | 0.407 | | | |
| 17 | 25.0 | 16.3 | 0.196 | 180 | 1.7 | 381.0 | 0.584 | 54.3 | 0.401 | 4.25 | 14.4 | 24.8 |
| 18 | 45.0 | 5.4 | 1.07 | 220 | 3.6 | 420.0 | 1.35 | 59.8 | 0.376 | 5.60 | 21.0 | 15.6 |

NOTE.—DAIP=Diallyl isophthalate monomer.

EXAMPLE 19

20 mg. each of the precopolymers obtained in Examples 11 to 18 were added to a test tube, and 2 cc. of

TABLE I

| | DAP $[M_1]$ (ml.) | Ethylene $[M_2]$ (g.) | $F=\frac{[M_1]}{[M_2]}$ | Polymerization time (min.) | Yield of polymer (percent) | Saponification degree | $f$ | Bromine value | Degree of residual unsaturation | Molecular weight (×10³) | Degree of polymerization | |
|---|---|---|---|---|---|---|---|---|---|---|---|---|
| | | | | | | | | | | | $m$ | $n$ |
| Control 1 | 0 | 25.7 | 0 | 90 | 4.7 | | | | | | | |
| Example: | | | | | | | | | | | | |
| 1 | 1.5 | 24.4 | 0.00184 | 120 | 5.1 | 85.5 | 0.0263 | 12.2 | 0.128 | | | |
| 2 | 1.6 | 24.5 | 0.00833 | 110 | 4.9 | 83.0 | 0.0254 | 11.8 | 0.134 | | | |
| 3 | 3.0 | 24.0 | 0.0147 | 130 | 3.5 | 142 | 0.0518 | 20.3 | 0.167 | | | |
| 4 | 5.0 | 22.7 | 0.0281 | 140 | 5.0 | 207 | 0.0955 | 29.6 | 0.176 | 4.36 | 8.1 | 84.5 |
| 5 | 7.5 | 22.5 | 0.0425 | 160 | 4.5 | 246 | 0.134 | 35.1 | 0.202 | 4.64 | 10.2 | 76.0 |
| 6 | 10.0 | 21.6 | 0.0591 | 150 | 3.0 | 280 | 0.181 | 39.8 | 0.205 | 4.89 | 12.2 | 67.4 |
| 7 | 15.0 | 21.1 | 0.0907 | 170 | 1.9 | 314 | 0.251 | 44.6 | 0.207 | 4.93 | 13.8 | 54.8 |
| 8 | 25.0 | 17.2 | 0.185 | 180 | 3.4 | 368 | 0.479 | 52.4 | 0.210 | 5.08 | 16.7 | 34.8 |
| 9 | 45.0 | 5.0 | 1.14 | 220 | 4.7 | 408 | 0.977 | 58.1 | 0.220 | 4.94 | 18.0 | 18.4 |

NOTE.—DAP=Diallyl ortho-phthalate monomer; $f$=Mole ratio of diallyl phthalate/ethylene in the copolymer; F=Mole ratio of diallyl phthalate/ethylene in the feed monomeric mixture; Degree of residual unsaturation=mole ratio of unreacted allyl group based on the total allyl groups of diallyl phthalate in the precopolymer; $m$=Diallyl phthalate unit number; $n$=Ethylene unit number.

EXAMPLE 10 AND CONTROL 2

Each of the precopolymers obtained in Examples 1 to 8 and commercially available low molecular weight polyethylene was added to a test tube in an amount of 20 mg. each of the solvents indicated were added to examine the solubility of the precopolymers. With regard to some of the solvents, the solubility of the copolymers at 50° C. and 65° C. was also examined. The melting point of each specimen was examined by a micro melting point measuring apparatus. The results are given in Table IV.

kg./cm.$^2$. The product was treated in the same way as set forth in Example 20. The yield of the polymer was

TABLE IV

| | Melting point (° C.) | Benzene, room temp. | Solubility | | | | | | Decahydro-naphthalene | |
| | | | n-Hexane | | Chloroform | | Acetone, room temp. | Toluene, room temp. | | |
| | | | Room temp. | 65° C. | Room temp. | 50° C. | | | Room temp. | 65° C. |
|---|---|---|---|---|---|---|---|---|---|---|
| Precopolymer of— | | | | | | | | | | |
| Example 11 | 94–98 | ○ | X | ○ | ○ | ⦾ | X | ○ | X | ⦾ |
| Example 12 | 74–78 | ⦾ | X | ⊚ | ○ | ⦾ | X | ○ | X | ⦾ |
| Example 13 | (¹) | ⦾ | X | X | ⦾ | ⦾ | X | ⦾ | X | ⦾ |
| Example 14 | (¹) | ⦾ | X | X | ⦾ | ⦾ | X | ⦾ | X | ⦾ |
| Example 15 | (¹) | ⦾ | X | X | ⦾ | ⦾ | ⊚ | ⦾ | X | ⦾ |
| Example 16 | (¹) | ⦾ | X | X | ⦾ | ⦾ | ⦾ | ⦾ | X | △ |
| Example 17 | (¹) | ⦾ | X | X | ⦾ | ⦾ | ⦾ | ⦾ | X | X |
| Example 18 | 75–87 | ⦾ | X | X | ⦾ | ⦾ | ⦾ | ⦾ | X | X |

¹ Viscous liquid.

NOTE.—⦾=Completely dissolved; ○=Slightly turbid; ⊚=Considerably turbid; △=Swelled; X-Insoluble.

EXAMPLE 20

A 100 ml. stainless steel autoclave equipped with a stirrer was charged with 60 ml. of distilled water, 0.5 ml. of a phosphoric acid ester of polyoxyethylene alkyphenyl ether (PULAI SĀFU–A212C; Daiichi Kogyo Seiyaku, Japan) as an emulsifier, 10 ml. of diallyl ortho-phthalate, and 0.2 g. of 4,4'-azobis-4-cyanoic acid as an initiator, and then immersed in an oil bath at 85° C. With stirring, ethylene gas was continuously filled into the autoclave from a weighed small-sized ethylene bomb so that the inner pressure of the autoclave did not exceed 50 kg./cm.$^2$. The reaction was stopped after a lapse of 6 hours, and the turbid contents were taken out.

The emulsified liquor was concentrated at reduced pressure and the polymer was analyzed. The yield was 40%, the diallyl phthalate/ethylene molar ratio as measured from the saponification value was 0.615, the bromine value was 31.0 and the molecular weight was 24,000.

EXAMPLE 21

An autoclave of the same type as used in Example 20 was charged with 60 ml. of water, 15 ml. of benzene, 0.5 g. of polyvinylalcohol (degree of polymerization 1,200; saponification 75%) as a suspending agent, 15 ml. of diallyl iso-phthalate, and 2 g. of benzoyl peroxide as an initiator. Then, by the same procedure as set forth in Example 20, the polymerization was performed for 6 hours while maintaining the ethylene pressure at 50 kg./cm.$^2$. The product was treated in the same way as set forth in Example 20. The yield of the polymer was 72.4%, the diallyl phthalate/ethylene mol ratio was 0.52, the molecular weight of the polymer was 11,000, and the bromine value was 25.0.

EXAMPLES 22 TO 27

A 25 liter stainless steel autoclave equipped with a stirrer and a thermometer was charged with a predetermined amount shown in Table V of diallyl orthophthalate, 5 liters of benzene and 600 g. of dibenzoyl peroxide. The inside of the autoclave was then purged with nitrogen, and ethylene was introduced under pressure into the autoclave through a charger. The inside of the autoclave was maintained at a temperature of 85° C. and a pressure of 80 kg./cm.$^2$. The charger had been inspected, and the introduction of a predetermined amount of ethylene under pressure was performed using a pressure gauge attached to the charger. The polymerization reaction was performed for a predetermined time at 85° C. The reaction product was separated by the same method as in Example 1. The diallyl phthalate/ethylene molar ratio of the precopolymer, its bromine value and molecular weight were measured, and the results are shown in Table V.

TABLE V

| | DAP [M₁] (kg.) | Ethylene [M₂] (kg.) | $F = \dfrac{[M_1]}{[M_2]}$ | Polymerization time (min.) | Yield of polymer (percent) | f | Bromine value | Molecular weight (×10³) |
|---|---|---|---|---|---|---|---|---|
| Example: | | | | | | | | |
| 22 | 0.246 | 2.77 | 0.011 | 100 | 48.6 | 0.027 | 6.0 | 9.3 |
| 23 | 0.492 | 2.74 | 0.020 | 120 | 48.5 | 0.060 | 10.3 | 8.6 |
| 24 | 1.23 | 2.66 | 0.053 | 140 | 49.2 | 0.112 | 16.2 | 7.3 |
| 25 | 2.21 | 2.55 | 0.099 | 160 | 49.8 | 0.203 | 21.5 | 6.5 |
| 26 | 4.43 | 2.30 | 0.220 | 180 | 50.3 | 0.446 | 24.6 | 6.2 |
| 27 | 14.27 | 1.18 | 1.381 | 200 | 51.1 | 2.150 | 30.1 | 7.8 |

EXAMPLES 28 TO 33

Diallyl isophthalate and ethylene were copolymerized in the same way as set forth in Examples 22 to 27. The conditions and the results obtained are given in Table VI below.

TABLE VI

| | DAI [M₁] (kg.) | Ethylene [M₂] (kg.) | $F = \dfrac{[M_1]}{[M_2]}$ | Polymerization time (min.) | Yield of polymer (percent) | f | Bromine value | Molecular weight (×10³) |
|---|---|---|---|---|---|---|---|---|
| Example: | | | | | | | | |
| 28 | 0.246 | 2.77 | 0.010 | 100 | 49.2 | 0.028 | 11.0 | 8.8 |
| 29 | 0.467 | 2.75 | 0.019 | 120 | 48.6 | 0.063 | 18.6 | 8.1 |
| 30 | 0.861 | 2.70 | 0.036 | 140 | 47.5 | 0.121 | 28.2 | 7.6 |
| 31 | 1.65 | 2.61 | 0.072 | 160 | 49.6 | 0.216 | 36.5 | 6.3 |
| 32 | 3.49 | 2.40 | 0.165 | 180 | 51.1 | 0.449 | 45.3 | 5.8 |
| 33 | 12.60 | 0.92 | 1.05 | 200 | 51.9 | 2.26 | 56.2 | 6.5 |

EXAMPLES 34 TO 37 AND CONTROL 3

Five resin solutions were prepared in accordance with the recipes shown in Table VII. Each of the solutions was coated by a #34 bar coater on a steel plate (150 x 70 x 0.5 mm.) degreased and polished with #240 sand paper, and dried in air. Then, it was allowed to stand for 10 minutes at 150° C. to form a lustrous cured film. Its performance was tested, and the results are shown in Table VII.

The diallyl phthalate resin used in Control 3 is a diallyl ortho-phthalate prepolymer having a number average molecular weight, measured as defined hereinabove, of 9,300 and a bromine value of 37.8.

The properties tested were as follows:

Hardness

This is "pencil hardness." The sample is scratched with a pencil having its core tip flattened. The angle of the pencil to the sample is 45°, and a load of one kilogram is exerted on the pencil. The hardness of the pencil which does not injure the same is taken as the hardness of the sample.

Adhesiveness

In accordance with Cross Cut Test, using a diamond needle, 100 squares each having an area of 1 mm.$^2$ are provided per cm.$^2$ of the coated surface of the sample. An adhesive cellophane tape is applied thereto, and then abruptly peeled off in a direction at an angle of 45° to the surface. The state of the film after peeling off the adhesive cellophane is observed.

Flexural resistance

In accordance with a mandrel tester, the sample is bent 180° with the coated side facing outwards using supporting rods of various diameters as the center. The state of the film at the bent surface is observed.

Impact strength

In accordance with a Du Pont impact tester, a weight with a diameter of ½ inch is allowed to fall onto the coated surface with a load of one kilogram with a fall of 50 cm., and the state of the film is observed.

were irradiated onto the coat to form a cured film not attacked by acetone and benzene. The film was lustrous, transparent, and beautiful.

When 1% by weight of dibenzoyl peroxide was added to the above solution, and electron beams of 3 Mrad were irradiated onto the resulting coated film, a lustrous, transparent and beautiful cured film not attacked by acetone and benzene was attained. The irradiation source used was a 0.3 m.e.v. transformer-type electron beam accelerator. In the cross cut test, the coated film showed no change. In the mandrel bending test, no change was observed in the coated film when the film was bent 180° with a mandrel having a diameter of 3 mm. rod.

EXAMPLES 40 AND 41 AND CONTROL 5

100 parts of each of the precopolymer of Example 26, a 1:1 mixture of the precopolymer of Example 26 and the diallyl phthalate resin in Control 1, and such diallyl phthalate resin, 3 parts of dibenzoyl peroxide, and 0.5 part of lauric acid (mold releasing agent) were dissolved in a mixture of 50 parts of toluene and 50 parts of acetone. The resulting solution was impregnated into printing paper having a unit weight of 80 g./m.$^2$ and dried to obtain resin-impregnated paper having a resin content of 50–55%. The paper was superposed on a 3 mm. thick plywood, and the assembly was heat pressed for 10 minutes at 130° C. and 15 kg./cm.$^2$. After releasing the pressure, a lustrous beautiful decorative laminate was obtained in each case. The abrasion test was conducted on each of the decorative laminates obtained, using a Taber abraser. The number of rotations of the abrasive turntable was checked at the time when the printed pattern began to disappear. The results are shown in Table VIII.

TABLE VIII

| Samples | | Number of rotations per minute |
|---|---|---|
| Example: | | |
| 40 | Decorative laminate from the copolymer of Example 28. | 100–120 |
| 41 | Decorative laminate from a mixture of the copolymer of Example 26. | 80–100 |
| Control 5 | Decorative laminate from the diallyl phthalate resin of Control 1. | 60–80 |

TABLE VII

| | Example 34 | Example 35 | Example 36 | Example 37 | Control 3 |
|---|---|---|---|---|---|
| Formulation: | | | | | |
| Resin used | Example 25 (100 parts) | Example 26 (100 parts) | Example 31 (100 parts) | Example 32 (100 parts) | Diallyl phthalate resin (100 parts). |
| Toluene | 100 parts | 50 parts | 100 parts | 50 parts | 50 parts. |
| Acetone | do | do | do | do | Do. |
| Tert.-butyl perbenzoate | 2 parts | 2 parts | 2 parts | 2 parts | 2 parts. |
| Titanium oxide | 30 parts | 30 parts | 30 parts | 30 parts | 30 parts. |
| Performance test: | | | | | |
| Hardness | H | 3H | H | 3H | 4H. |
| Adhesiveness | No change | No change | No change | No change | Much peel off. |
| Flexural resistance | No change, with φ/mm. mandrel | do | do | do | Complete peel off. |
| Impact strength | No change | do | do | do | Do. |

EXAMPLE 38 AND CONTROL 4

100 parts of the powdery precopolymer obtained in Example 27 were mixed with 3 parts of dicumyl peroxide and 30 parts of cadmium red as a pigment by the master batch method. The mixing was effected thoroughly using a mixer to prepare a powdery paint.

The powdery paint was coated uniformly on a steel plate preheated to about 200° C., using a fluidized immersion tank. In several seconds, the paint was melted, and a lustrous, tough film of red color and of uniform quality and good adhesive property was obtained.

When a diallyl ortho-phthalate prepolymer was coated by the same method, a similar film was obtained, but it was a "brittle" film which was easily peeled off by a nail.

EXAMPLE 39

A solution of 40 parts of the precopolymer obtained in Example 26 in 60 parts of methyl acrylate was prepared, and coated in a thickness of 25 microns on a steel plate (15 x 5 x 0.5 mm.) degreased and polished with sand paper. Immediately thereafter, electron beams of 4 Mrad

EXAMPLE 42 AND CONTROL 6

10 parts of the precopolymer of Example 30, 90 parts of high density polyethylene (product of Mitsui Petrochemical Industries; molecular weight 5,500), 0.5 part of dicumyl peroxide and 2 parts of calcium stearate were mixed in the form of powders, and then roll kneaded at 100–120° C. Separately, another sample was prepared from 100 parts of high density polyethylene and the same amounts of the additives by roll kneading.

These samples were hot pressed at 150° C. and 25 kg./cm.$^2$ for 10, 20, and 30 minutes respectively. Each of the pressed samples was put into a 150-mesh stainless steel basket, and boiled in toluene for 6 hours. The samples were then dried in vacuo at room temperature for 24 hours, and the insoluble component content was measured. The results are given in Table IX.

The insoluble component content was obtained by dividing the weight of the sample after boiling and drying by its weight before boiling, and expressed in percent.

TABLE IX

| Hot pressing time (minutes) | 10 | 20 | 30 |
|---|---|---|---|
| Example 42 — Mixture of the precopolymer of Example 30 with high density polyethylene. | 49.8 | 85.4 | 95.4 |
| Control 6 — High density polyethylene | 24.5 | 62.1 | 88.4 |

EXAMPLE 43

100 parts of the precopolymer of Example 30 were dissolved in 100 parts of benzene, and 2 parts of tertiary butyl perbenzoate as a curing catalyst were added to form a resin solution. Separately, two soft steel plate test specimens of 20 x 20 x 0.5 mm. which had been degreased and polished with #240 and paper were prepared. The above resin solution was coated on one of these test specimens in an amount of 50 g./m.$^2$, and after air drying, the coated surface of the specimen was superposed on the polished surface, and the assembly was hot pressed at 150° C. and 5 kg./cm.$^2$. The adhered test specimen was attached to a metal block using a cyanoacrylate type adhesive. The adhesive strength was measured using a tension testing machine, and found to be 99 kg./cm.$^2$ at 20° C.

EXAMPLE 44

A resin varnish was prepared by mixing 100 parts of the precopolymer of Example 31, 4 parts of dicumyl peroxide, 70 parts of benzene and 30 parts of acetone, and was impregnated into kraft paper having a unit weight of 180 g./m.$^2$. After air drying, the varnish was precured for 5 minutes at about 80° C. to form impregnated kraft paper with a prepolymer impregnation degree of 65% by weight. The above varnish was coated by a #34 bar coater on a 0.07 mm. thick copper foil treated with chemicals, and after drying in air, was precured for 5 minutes at about 80° C. Five sheets of the impregnated paper obtained were superposed one on top of the other, and the above copper foil (with the coated surface facing downwards) was placed on the uppermost sheet, and cured at 150° C. and 45 kg./cm.$^2$ for 30 minutes to form a copper foil-applied laminated plate. When holes were provided on this laminated plate by a drill, clear holes could be obtained with ease. When the laminated plate was bent 180° along a polyvinyl chloride pipe having a diameter of 10 cm., no adverse effects such as cracks or peel were observed.

EXAMPLE 45 AND CONTROL 7

100 parts of the precopolymer of Example 26 and 3 parts of tertiary butyl perbenzoate were dissolved in a mixture of 50 parts of benzene and 50 parts of acetone to prepare an impregnating solution. A Volan-treated plain weave glass cloth (100 mm. x 150 mm.) was impregnated in the resulting solution, and dried in air, followed by precuring at about 80° C. for 5 minutes. As a result an impregnated glass cloth having a resin pickup of 30 percent by weight was obtained. Eight sheets of the impregnated cloth were superposed one on top of the other, and fabricated for 20 minutes at 150° C. and 45 kg./cm.$^2$ to form a laminated plate having a thickness of about 2 mm.

Separately, a 2 mm. thick laminate plate was produced in the same way as above using a diallyl phthalate prepolymer (same as one used in Control 1), and used as a control sample. The performance test was conducted on each of these samples in accordance with ASTM. The diallyl phthalate resin laminate plate is shown as Control 7.

TABLE X

| Test Items (ASTM) | Example 45 | Control 7 |
|---|---|---|
| Tensile strength (D-638), kg./mm.$^2$ | 30.1 | 26.5 |
| Compressive strength (D-695), kg./mm.$^2$ | 32.3 | 28.2 |
| Flexural strength (D-790), kg./mm.$^2$ | 47.9 | 46.8 |
| Impact strength, Izod (D-256), kg. cm./cm.$^2$ | 32.1 | 28.4 |
| Hardness, Rockwell (D-785) | M115 | M120 |
| Water absorption, 24 hrs. (D-570), percent | 0.08 | 0.12 |
| Dielectric constant, 1 kc. as is, (D-150) | 4.3 | 4.9 |
| Dissipation factor, 1 kc. as is, (D-150) | 1.1×10$^{-3}$ | 6.2.10$^{-3}$ |

EXAMPLE 46 AND CONTROL 8

48 parts each of the precopolymer of Example 26 and diallyl phthalate prepolymer (same as Control 1), 1 part of dicumyl peroxide, and 1 part of calcium stearate were dissolved in 50 parts of acetone, followed by adding and mixing 48 parts of glass staple fibers having a length of 6.35 mm. and 7 parts of kaolin. The mixture was then dried in air, and roll kneaded at 60 to 90° C. to form two pellet-like fabricating materials. These were compression molded at 150° C. and 100 kg./cm.$^2$ using various molds. The performance test was conducted in accordance with ASTM, and the results are shown in Table XI. Control 8 is an example in which the diallylphthalate prepolymer was used.

EXAMPLE 47 AND CONTROL 9

59 parts each of the precopolymer of Example 26 and the diallyl phthalate prepolymer of Control 1, 1 part of dicumyl peroxide, and 1 part of calcium stearate were dissolved in 60 parts of acetone, followed by adding and mixing 26 parts of acrylic fibers and 13 parts of kaolin. The mixture was dried in air, and roll kneaded at 60–90° C. to form pellet-like fabricating materials. The materials were compression molded at 150° C. and 100 kg./cm.$^2$ using various molds. The performance test was conducted in accordance with the ASTM testing method. The results are shown in Table XI. Control 9 is an example in which diallyl ortho-phthalate prepolymer was used.

TABLE XI

| | Control 8 | Example 46 | Control 9 | Example 47 |
|---|---|---|---|---|
| Tensile strength (kg./mm.$^2$) (D-638) | 5.5 | 7.2 | 4.8 | 4.8 |
| Compressive strength (D-695) (kg./mm.$^2$) | 17.8 | 24.5 | 22.0 | 26.0 |
| Flexural strength (kg./mm.$^2$) (D-790) | 7.6 | 14.3 | 7.0 | 12.8 |
| Izod impact strength (kg. cm./cm.$^2$) | 4.5 | 7.8 | 6.7 | 11.2 |
| Rockwell hardness (D-785) | M120 | M105 | M105 | M100 |
| Dielectric constant (1 kc. as is) (D-150) | 4.4 | 3.8 | 3.8 | 3.3 |

EXAMPLE 48 AND CONTROL 10

Each of the fabricating materials in Example 46 and Control 9 was molded under the following conditions using an injection molder (Model K1-100, Matsuda Seisakusho), and the properties were measured.

Control 10 is an example in which the fabricating material of Control 9 was used.

MOLDING CONDITIONS

Cylinder temperature:
  Nozzle side _____ ° C __ 70
  Feed side _____ ° C __ 35
Mold temperature _____ ° C __ 160
Injection time _____ seconds __ 30
Curing time _____ do ____ 60
Injection pressure _____ kg./cm.$^2$ __ 700

TABLE XII

| Test Items | Control 10 | Example 48 |
|---|---|---|
| Flexural strength (kg./mm.$^2$) (D-790) | 14.2 | 18.1 |
| Izod impact strength (kg./cm./cm.$^2$) (D-256) | 3.8 | 5.6 |

EXAMPLES 49 to 58, COMPARATIVE EXAMPLES 1 TO 10, AND CONTROL 11

Prepolymers were prepared in Examples 49 to 58, Comparative Examples 1 to 10, and Control 11 in accordance with the methods of Examples 22 to 33. The heat resistance, water absorption after boiling, drillability, flexibility, insulation resistance after boiling, stain resistance, weatherability, and abrasion resistance of the shaped products from these prepolymers were measured. The results were rated on a scale of A, B, and C in the decreasing order of excellence. The results are given in Table XIII.

The test methods and the standards for evaluation are as follows:

Heat resistance

A resin solution consisting of 40 parts of a resin, 1.6 parts of tert.-butyl perbenzoate, and 60 parts of toluene was impregnated into a Volan-treated plain weave glass cloth, and dried to obtain a resin-impregnated glass cloth containing about 45% of the resin. After precuring for 10 minutes at 90° C., eight sheets of the cloth were laminated, and molded for 20 minutes at 150° C. and 50 kg./cm.$^2$ to obtain a laminated plate having a thickness of 2 mm.±0.1 mm. A square with a size of 50 x 50 mm. was cut out from this plate for use as a test specimen.

The test specimen was aged for 4 hours in an air oven at 250° C., and the appearance, change in weight (rate of weight loss), and dimensional stability were measured.

(a) APPEARANCE

Change in color:
  C: brown
  B: light brown
  A: no change

Extent of cracks or blisters:
  C: all over the surface
  B: partly
  A: no change

(b) DIMENSIONAL STABILITY

Change in dimension of 50 mm. sides of the test specimen was measured, and the rate of loss was expressed in percent by the following equation.

Rate of loss (percent)
$$= \frac{\text{Original length} - \text{Length after ageing}}{\text{Original length}} \times 100$$

C: above 0.5%
B: 0.5 to 0.1%
A: less than 0.1%

(c) WEIGHT STABILITY $$\frac{\text{Original weight} - \text{Weight after aging}}{\text{Original weight}} \times 100$$

C: above 10%
B: 10 to 1%
A: less than 1%

WATER ABSORPTION AFTER BOILING

As a test specimen, the 50 x 50 x 2 mm. glass cloth laminate obtained in the heat resistance test was used. The test specimen was immersed in boiling water, and taken out after a lapse of 100 hours. Changes in weight were measured, and the water absorption was calculated as follows:

Water absorption
$$= \frac{\text{Weight after boiling} - \text{Original weight}}{\text{Original weight}} \times 100$$

C: above 3%
B: 3 to 0.5%
A: less than 0.5%

DRILLABILITY

The glass laminate plate used in the heat resistance test was used as a test specimen. Holes were provided on the test specimen using a drill having a diameter of 6 mm. at a speed of 1000 r.p.m. at room temperature, and the appearance was observed.

C: width of whitening around the hole above 1 mm.
B: width of whitening around the hole 1 to 0.2 mm.
A: width of whitening around the hole less than 0.2 mm.

FLEXIBILITY

Glass cloth having a thickness of 1±0.05 mm. was prepared by superposing four glass cloths in accordance with the method shown in the heat resistance test above. The cloth was bent along polyvinyl chloride pipes of different diameters, and the occurrence of hair cracks was observed.

Cm.
C: the minimum diameter of the pipe which
   led to hair cracks _____ Above 10
B: the minimum diameter of the pipe which
   led to hair cracks _____ 10 to 3
A: the minimum diameter of the pipe which
   led to hair cracks _____ Less than 3

INSULATION RESISTANCE AFTER BOILING 50 parts of a resin, 50 parts of glass fibers having a length of 6.5 mm., 1 part of calcium stearate, 1 part of tert.-butyl perbenzoate, 70 parts of toluene, and 30 parts of acetone were mixed, dried in air, and then kneaded with a hot roll to produce a compounded product. The composition obtained was compression molded for 30 minutes at 150° C. and 100 kg./cm.$^2$. The insulation resistance (ohms) after boiling was measured in accordance with ASTM D-257.

C: resistance value is less than $10^{12}$ ohms
B: resistance value is $10^{12}$ to $10^{15}$ ohms
A: resistance value is above $10^{15}$ ohms

STAIN RESISTANCE

A disc with a size of 50φ x 3 mm. was prepared under the same condition using the composition obtained in the insulation resistance test above. The test specimen was boiled for 2 hours in soybean source, and washed for 30 minutes with cold water. The state of coloration was then observed.

C: brown
B: light brown
C: no change

EASE OF FABRICATION

Fifty discs were prepared under the molding conditions in the insulation resistance test above using the compounds used in the insulation resistance test. The number of poor products was counted, and the ease of fabrication was calculated as follows:

Ease of fabrication
$$= \frac{50 - \text{the number of poor products}}{50} \times 100$$

C: less than 50
B: 50 to 95
A: above 95

WHEATHER RESISTANCE (OUTDOOR EXPOSURE TEST)

Each of the resin solutions used in the heat resistance test was coated on a tin plate (15 x 5 x 0.5 mm.) using a #34 bar coater, dried in air, and baked for 30 minutes at 160° C. The back of the plate was coated with a rust-proof paint, and the edge was sealed with solid paraffin. Each of the samples was placed at the top of the building of Osaka Soda Research Laboratory (Amagasaki City, Hogyo-prefecture, Japan) at an angle of 45° with the coated surface upward and facing south, and exposed to weathering for 6 months from March to October 1970. The state of the coated film after exposure was observed.

C: Blister and rust appeared all over the surface, and a part of the film peeled off.
B: Blister and rust formed partly.
A: No change.

were attached to the staircase at the central part of the Osaka Soda Research Laboratory, and allowed to be stamped for six months from March to October 1970. Then, the changes in the appearance were observed.

C: Much injury, crack, and peel, and the base material partly exposed
B: Many injuries, and partly cracks occured
A: Some injury

TABLE XIII

| | Diallyl ester | Composition in weight percent of precopolymer | | Precopolymer | | | Performance Tests | | | | | | | | | |
|---|---|---|---|---|---|---|---|---|---|---|---|---|---|---|---|---|
| | | | | | | | 1. Heat resistance | | | | 2. Water absorption after boiling | 3. Drill-ability | 4. Flexi-bility | 5. Insulation resistance after boiling | 6. Stain resistance | 7. Ease of fabrication | 8. Weathering | 9. Abrasion resistance |
| | | Diallyl ester | Ethylene | Molecular weight, $\overline{M}_n$ | Bromine value | a. Appearance | Crack and blister | b. Dimensional stability | c. Weight stability | | | | | | | | |
| Control 11 | DAI | 100 | 0 | 7,800 | 56.9 | B | A | A | A | A | C | C | B | A | A | A | C |
| Example 49 | DAI | 94.2 | 5.8 | 6,500 | 56.2 | B | A | A | A | A | B | B | B | A | A | A | B |
| Comparative Example: | | | | | | | | | | | | | | | | | |
| 1 | DAO | 94.9 | 5.1 | 5,700 | 55.4 | C | C | C | C | C | B | B | A | C | C | C | B |
| 2 | DAS | 95.4 | 4.6 | 6,700 | 56.5 | C | C | C | C | C | B | B | A | B | B | B | B |
| Example 50 | DAI | 79.8 | 20.2 | 5,800 | 45.3 | B | A | A | A | A | A | A | A | A | A | A | A |
| Comparative Example: | | | | | | | | | | | | | | | | | |
| 3 | DAO | 81.2 | 18.8 | 5,200 | 43.6 | C | C | C | C | C | B | A | A | C | C | C | A |
| 4 | DAS | 79.6 | 20.4 | 6,300 | 45.8 | C | C | B | B | B | B | A | A | B | A | B | A |
| Example 51 | DAI | 54.6 | 45.4 | 6,600 | 33.6 | B | A | A | A | A | A | A | A | A | A | A | A |
| Comparative Example: | | | | | | | | | | | | | | | | | |
| 5 | DAO | 56.1 | 43.9 | 6,100 | 32.9 | C | C | C | C | C | B | A | A | C | C | C | A |
| 6 | DAS | 55.3 | 44.7 | 7,300 | 33.5 | C | B | B | B | B | B | A | A | B | A | B | A |
| Example 52 | DAI | 44.6 | 55.4 | 7,900 | 24.2 | B | A | A | A | A | A | A | A | A | A | A | A |
| Comparative Example: | | | | | | | | | | | | | | | | | |
| 7 | DAO | 43.5 | 56.5 | 7,500 | 23.8 | C | B | C | B | B | B | A | A | C | B | B | B |
| 8 | DAS | 46.0 | 54.0 | 8,600 | 24.3 | B | B | C | C | C | B | A | A | B | A | B | B |
| Example 53 | DAI | 21.8 | 78.2 | 8,800 | 11.0 | B | A | B | A | A | A | A | A | A | A | A | A |
| Comparative Example: | | | | | | | | | | | | | | | | | |
| 9 | DAO | 79.9 | 80.1 | 8,500 | 11.1 | C | B | C | B | B | A | A | A | A | A | B | A |
| 10 | DAS | 21.3 | 78.7 | 8,900 | 11.6 | C | B | C | B | A | A | A | A | A | A | B | A |
| Example: | | | | | | | | | | | | | | | | | |
| 54 | DAP | 54.2 | 45.8 | 8,200 | 18.3 | B | A | A | A | A | A | A | A | A | B | A | A |
| 55 | DAT | 55.7 | 44.3 | 6,400 | 35.2 | B | A | A | A | A | A | A | A | --- | A | A | A |
| 56 | 1/1 mixture of DAP and DAI | 54.8 | 45.2 | 7,300 | 28.9 | B | A | A | A | A | A | A | A | --- | A | A | A |
| 57 | 1/1 mixture of DAP and DAT | 57.3 | 42.7 | 7,000 | 27.6 | B | A | A | A | A | A | A | A | --- | A | A | A |
| 58 | 1/1 mixture of DAI and DAT | 56.1 | 43.9 | 6,300 | 34.7 | B | A | A | A | A | A | A | A | --- | A | A | A |

NOTE.—DAI=Diallyl iso-phthalate; DAO=Diallyl Oxalate; DAP=Diallyl ortho-phthalate; DAS=Diallyl Sebacate; DAT=Diallyl tere-phthalate.

ABRASION RESISTANCE 6-mil thick printed paper was immersed in the resin solutions same as obtained in the heat resistance test except using disbenzoylperoxide instead of tert.-butyl peroxide, and dried in air. It was then superposed on a 10 mm.-thick plywood, and both were pressed through a polyester film for 10 minutes at 130° C. and 15 kg./cm.² to form a decorative laminate. The specimens obtained

What we claim is:

1. A diallyl phthalate-ethylene precopolymer having a number average molecular weight $\overline{M}_n$ of 2,000 to 30,000 comprising 20 to 95% by weight of a diallyl phthalate selected from the group consisting of diallyl ortho-phthalate, diallyl iso-phthalate, and diallyl terephthalate, and 80 to 5% by weight of ethylene, the percentages by weight being based on the total weight of the monomers.

2. The precopolymer of claim 1 wherein said precopolymer has a bromine value of 5 to 61.5.

3. The precopolymer of claim 1, wherein said precopolymer forms a true solution in benzene at 50° C. in a concentration of 30% by weight based on the weight of the benzene.

4. A process for producing a cross-linkable diallyl phthalate-ethylene precopolymer, which comprises copolymerizing a diallyl phthalate selected from the group consisting of diallyl ortho-phthalate, diallyl iso-phthalate and diallyl tere-phthalate with ethylene at an elevated temperature and pressure in the presence of a radical initiator.

5. The process of claim 4, wherein the amount of said diallyl phthalate is 20 to 95% by weight, and the amount of ethylene is 80 to 5% by weight, the percentages by weight being based on the total weight of the monomers.

6. The process of claim 4, wherein the polymerization temperature is from room temperature to 300° C.

7. The process of claim 4, wherein the pressure is from 5 kg./cm.² gauge to 3,000 kg./cm.² gauge.

8. The process of claim 4, wherein the radical initiator is a member selected from the group consisting of molecular oxygen, molecular oxygen-containing gases, $H_2O_2$, inorganic persulfates, organic peroxides, and organic azo compounds.

9. The process of claim 4, wherein the amount of said radical initiator is from 0.0001 to 0.05 mole percent based on the total amount of the diallyl phthalate and ethylene.

10. The precopolymer of claim 1 wherein said diallyl phthalate is present in an amount of 40 to 95% by weight and said ethylene is present in an amount of 60 to 5% by weight.

11. The precopolymer of claim 10 wherein said diallyl phthalate is present in an amount of 55 to 95% by weight and said ethylene is present in an amount of 45 to 5% by weight.

12. The precopolymer of claim 1 wherein said precopolymer has a number average molecular weight of 2,000 to 20,000.

13. The precopolymer of claim 12 wherein said precopolymer has a number average molecular weight of 2,000 to 15,000.

14. The precopolymer of claim 13 wherein said precopolymer has a number average molecular weight of 2,000 to 10,000.

15. The precopolymer of claim 2 wherein said precopolymer has a bromine value of 12 to 61.5.

16. The precopolymer of claim 15 wherein said precopolymer has a bromine value of 16 to 61.5.

References Cited
UNITED STATES PATENTS

| | | | |
|---|---|---|---|
| 3,390,116 | 6/1968 | Porret | 260—32.8 |
| 2,433,616 | 12/1947 | Marple et al. | 260—78.4 |

JOSEPH L. SCHOFER, Primary Examiner

J. KIGHT, Assistant Examiner

U.S. Cl. X.R.

117—126 GB, 132 R, 161 UC; 204—159.15; 260—78.5 UA, 78.5 T, 872